United States Patent [19]
Watkins

[11] 3,995,882
[45] Dec. 7, 1976

[54] FOLDING SUPPORT STRUCTURE

[76] Inventor: Mervyn M. Watkins, 30241 Via Borica, Rancho Palos Verdes, Calif. 90274

[22] Filed: Dec. 12, 1975

[21] Appl. No.: 640,198

Related U.S. Application Data

[63] Continuation-in-part of Ser. No. 568,164, April 14, 1975, abandoned.

[52] U.S. Cl. ................................. 280/649; 280/42; 280/650
[51] Int. Cl.² ......................................... B62B 11/00
[58] Field of Search ............ 280/42, 647, 649, 650, 280/642, 644

[56] References Cited
UNITED STATES PATENTS

| | | | |
|---|---|---|---|
| 2,722,972 | 11/1955 | Altruda | 280/42 |
| 3,797,848 | 3/1974 | Burnham | 280/644 |
| 3,836,164 | 9/1974 | Sugino | 280/42 |
| 3,848,884 | 11/1974 | Lines | 280/644 |

*Primary Examiner*—Robert R. Song
*Attorney, Agent, or Firm*—John Holtrichter, Jr.

[57] ABSTRACT

A folding structure in one embodiment including ground wheels and handles to form a child's stroller, the structure having a pair of elongated frame tubes that are laterally foldable and held together at two spaced points on each of the tubes by pivotally connected front and rear X braces, the structure also including a pair of elongated seat tubes pivotally attached to main frame tube-supported folding mechanisms that allow the seat tubes to move upwardly and in closer angular alignment with the main frame tubes when the latter move closer together as the structure is changed from its unfolded to folded configuration, resulting in a folded cross-sectional area not much greater than the sum of the cross-sectional areas of the individual members.

26 Claims, 16 Drawing Figures

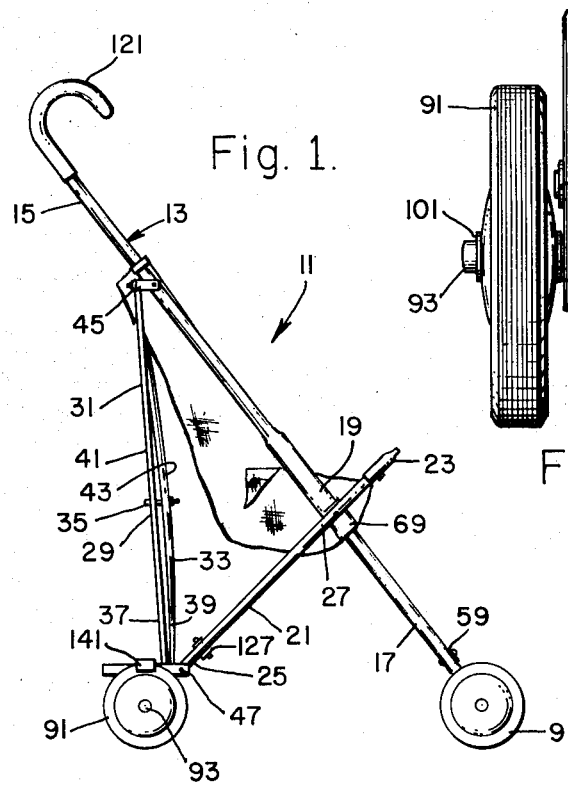
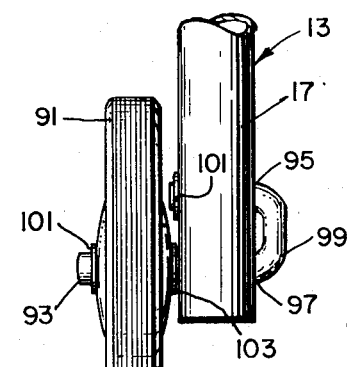
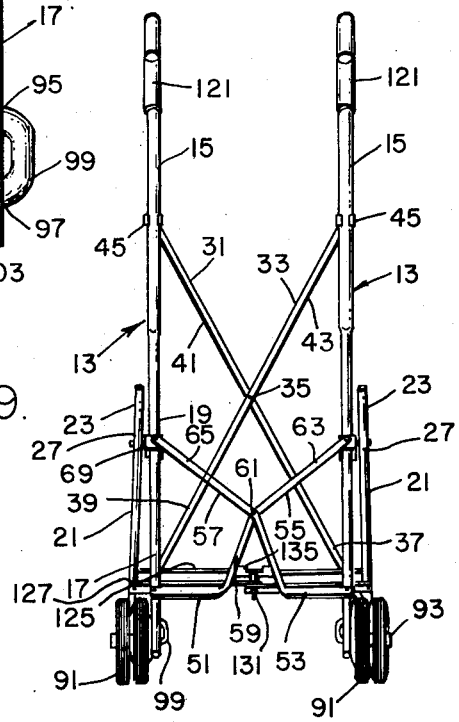
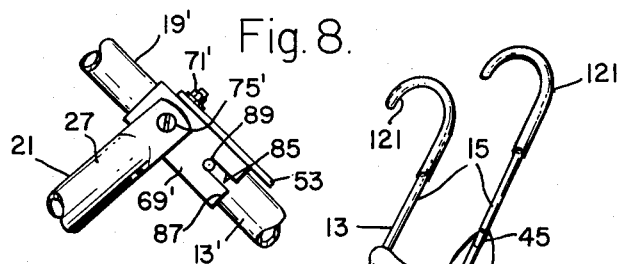
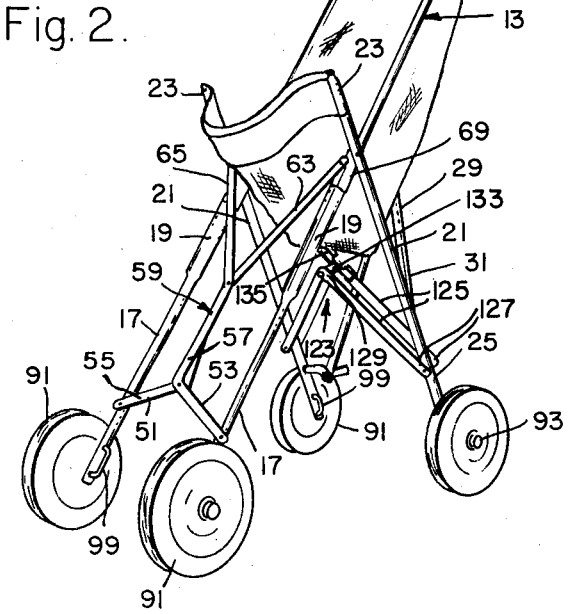
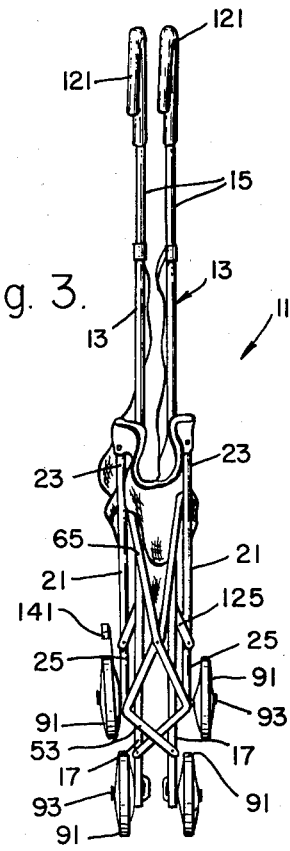

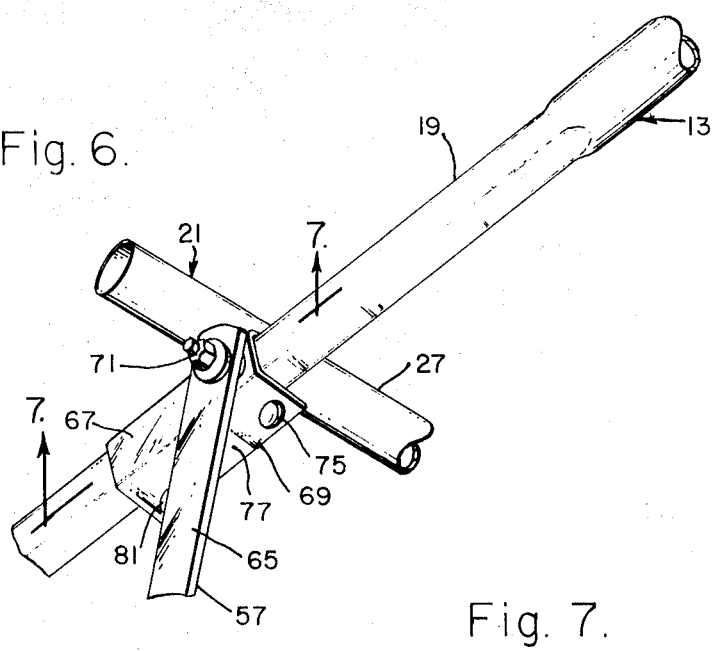
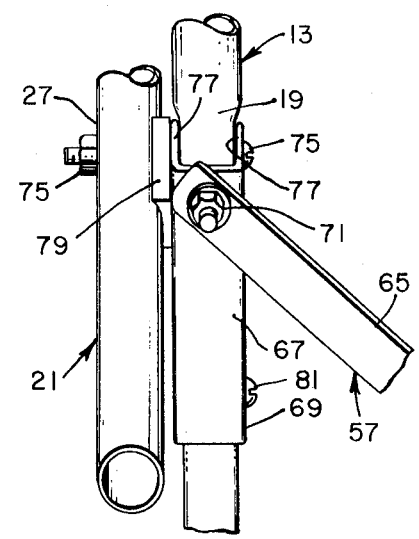
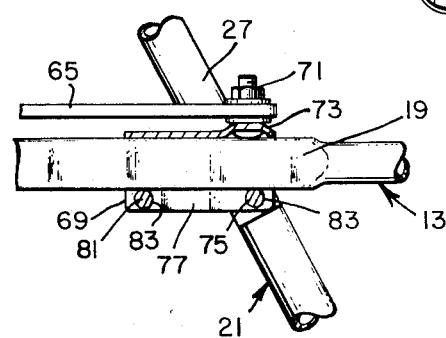
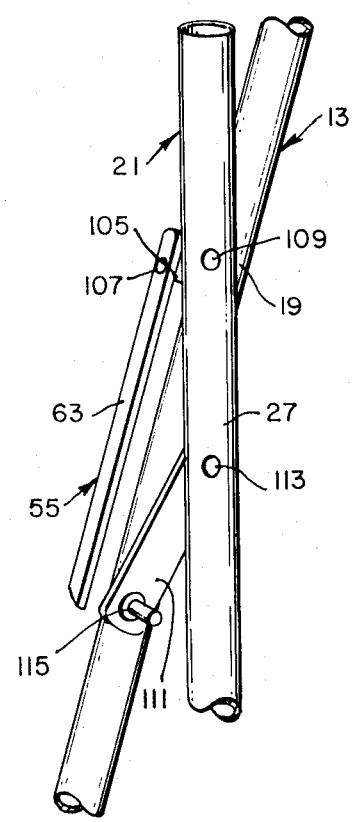
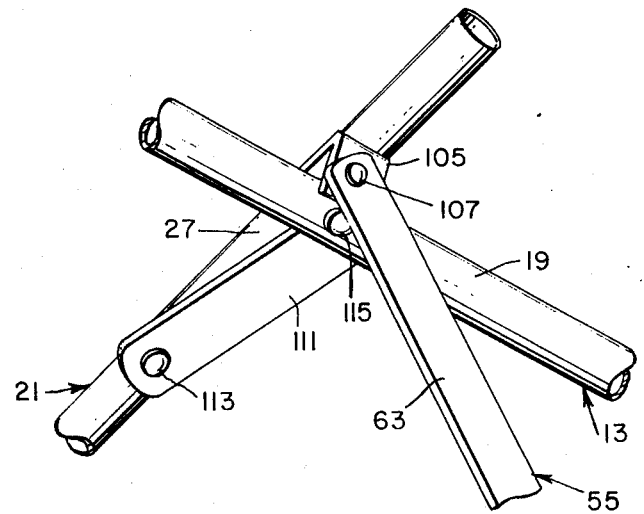

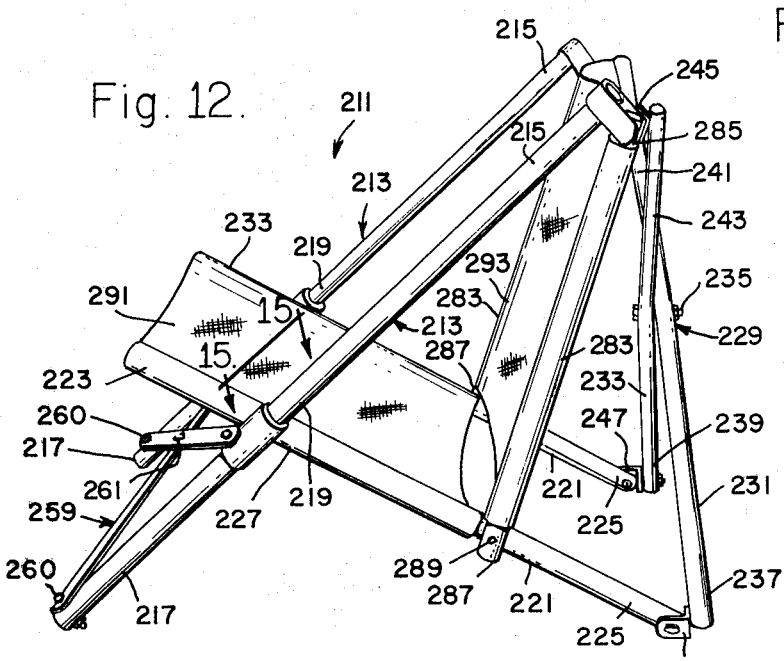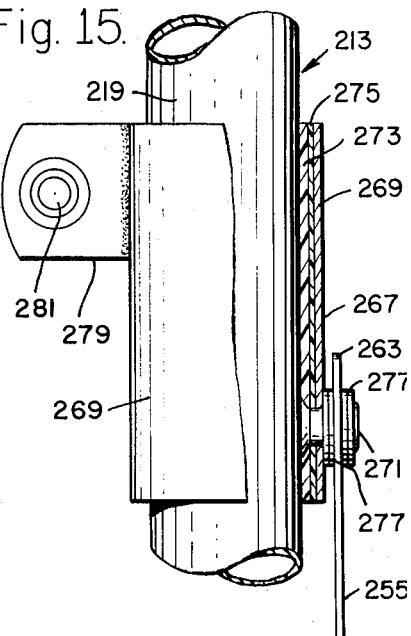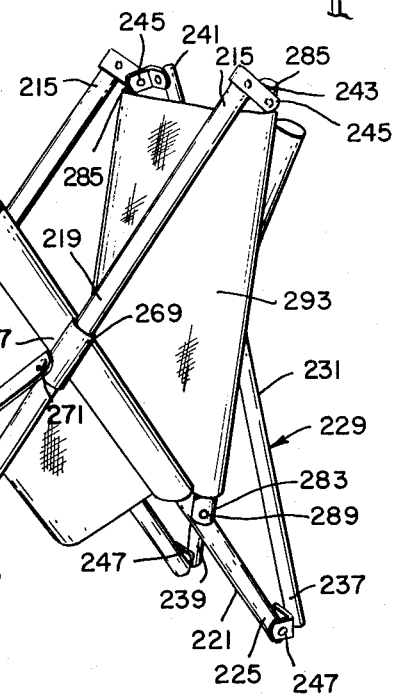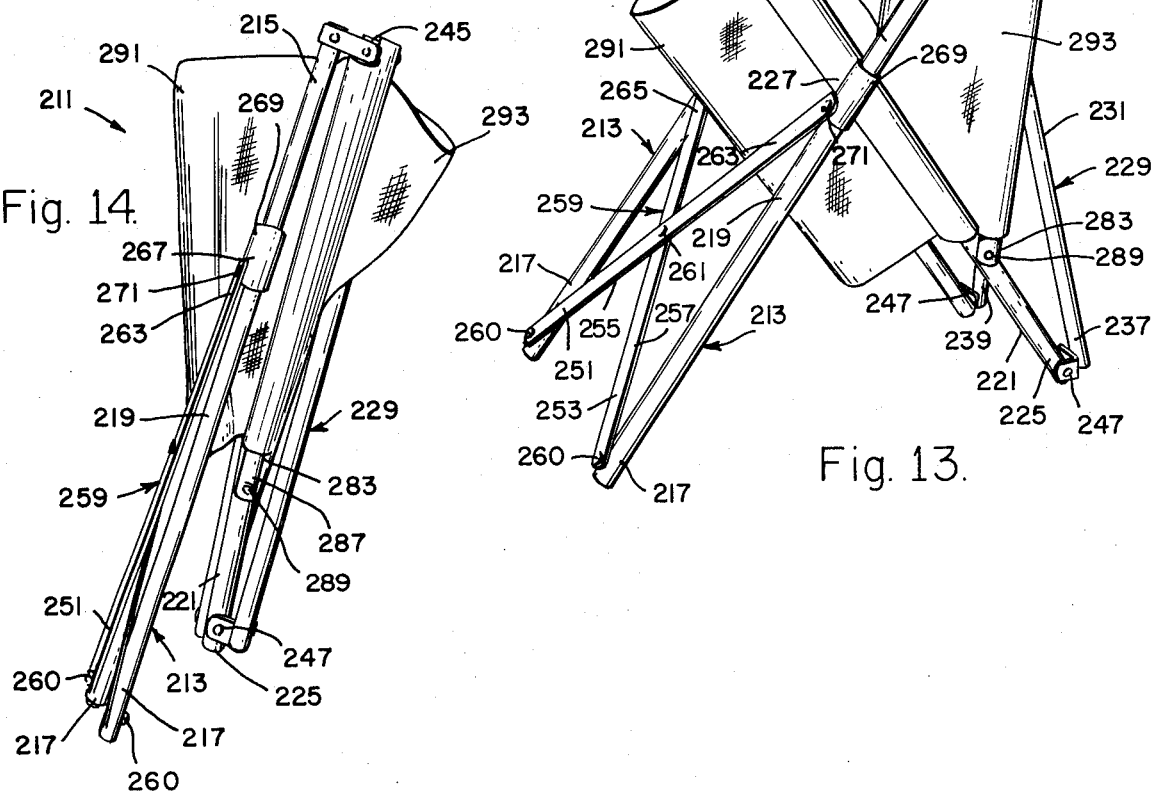

FOLDING SUPPORT STRUCTURE

This is a continuation-in-part application of a previous application Ser. No. 568,164, filed Apr. 14, 1975, now abandoned.

BACKGROUND OF THE INVENTION:

The background of the invention will be set forth in two parts.

1. Field of the Invention

This invention relates to folding support structures and more particularly to those structures used as child strollers and chairs.

2. Description of the Prior Art

Folding structures of the type adapted to support an object or a person are well known. By far, most of these structures fold only in one dimension, that is, they fold "flat." This is a rather bulky configuration and leaves something to be desired when considering ease of storage and transportation.

For some applications, ground wheels have been provided in order to facilitate movement of the structure when it is supporting a person, for example. A typical application of this type is a folding wheel chair. Again, most of these chairs fold only in one dimension, i.e., laterally.

In more recent times, much interest has been directed to folding baby carriages or strollers having wheels for ease of movement of the stroller and its occupant. A very popular example of this type structure is called a "stick folding" or "umbrella" structure since it folds in two dimensions to provide an elongated thin silhouette. A typical example of this type configuration is described in U.S. Pat. No. 3,390,893 directed to structures for folding baby carriages, chairs, and the like.

Prior art structures may include two X frames which are directly interpivotally connected by means of two-axes pivot joints, the frames being held in their unfolded position at a fixed angle with respect to each other by rigid brace members pivotally connected to the frames. One of the X frames is usually more or less vertical and located at the back of the stroller, while the other is at the bottom of the structure and is generally horizontal in its unfolded position. In its folded configuration, the two X frames collapse and all elongated elements thereof are nearly parallel. The brace elements also fold about pivoted interconnections so that the ends of the X frames come together. This moves the front wheels near the location of the carriage's handles where they may soil clothes, for example, and, because of this elevated mass, a clip is required in order to retain the structure in a folded position. Thus, it should be evident that a foldable support structure that is simple in construction and that folds into a slim, trundable configuration while maintaining a low center of mass with all wheels always located near the ground level and that does not require a clip mechanism to hold the structure in its folded position would constitute a significant advancement of the art.

SUMMARY OF THE INVENTION:

In view of the foregoing factors and conditions characteristic of the prior art, it is a primary object of the present invention to provide an improved folding support structure.

Another object of the present invention is to provide a very light yet strong and durable folding support structure that may be simply moved from its unfolded to its elongated slim folded configuration.

Still another object of the present invention is to provide a simple yet reliable folding support structure that includes ground wheels and a pliable seat for comfortably supporting a child.

Yet another object of the present invention is to provide a folding support structure in the form of a baby stroller.

Still a further object of the present invention is to provide a wheeled folding support structure which, when in its folded configuration, provides that its wheels are located adjacent one another at the bottom of the structure, and that inherently tends to maintain its folded position without the use of any restricting mechanisms.

In accordance with the present invention, a folding support structure is provided having a pair of rigid elongated frame tubes each with upper, lower and intermediate portions and defining a first plane therebetween. A pair of rigid elongated seat tubes, each having lower and attachment portions define a second plane therebetween that intersects the first plane along a movable line perpendicular to the longitudinal axes of the frame and seat tubes in the intermediate and attachment portions thereof. Also included is a rear X brace having a pair of pivotally interconnected rigid rear brace members defining a third plane therebetween, the rear brace members being foldable in the third plane while the lower ends of these rear brace members are pivotally attached to a different one of the seat tubes at the lower portions. The upper ends of the rear brace members are pivotally attached to a different one of the frame tubes at their upper portions, and the pivoted interconnections at the ends of the rear brace members are of the two-axis type, one axis of which being perpendicular to the third plane and the other axis of which being orthogonal thereto and in the plane of the respective tubes to which the interconnections are attached. The invention also includes a front X brace having a pair of pivotally interconnected rigid front brace members defining a fourth plane therebetween, the front brace members being foldable in the fourth plane, the lower ends of these members being pivotally attached to a different one of the frame tubes at their respective lower portions. There is further, folding means associated with the upper ends of the front brace members and with the intermediate portions of the frame tubes and attachment portions of the seat tubes for simultaneously causing an upward movement of the aforementioned movable line in the first plane, a lessening of the angle between the lower portions of the first and second planes, and a lessening of the distance between respective ones of the frame tubes and between respective ones of the seat tubes when the seat structure is moved from its open to closed configuration.

A pliable seat structure may be attached to upper portions of the seat and frame tubes and the support structure may also include a rear lock brace mechanism pivotally attached to the lower portions of the seat tubes or rear X brace members for lockably separating the seat tubes in their unfolded configuration.

The lower portions of the front brace members may each include foot rest sections that are horizontal when the support structure is in its unfolded position.

The features of the present invention which are believed to be novel are set forth with particularity in the appended claims. The present invention, both as to its organization and manner of operation, together with further objects and advantages thereof, may best be understood by making reference to the following description, taken in conjunction with the accompanying drawings, in which like reference characters refer to like elements in the several views.

BRIEF DESCRIPTION OF THE DRAWINGS:

FIG. 1 is a side elevational view of a folding support structure in its unfolded configuration, constructed in accordance with one embodiment of the present invention;

FIG. 2 is a perspective view of the folding support structure shown in FIG. 1, partially folded;

FIG. 3 is a front elevational view of the folding support structure of FIG. 1 in its fully folded configuration;

FIG. 4 is a front elevational view showing the basic frame of the folding support structure in its unfolded configuration;

FIG. 5 is an enlarged top view of a portion of the folding support structure of FIG. 1 showing in detail one of its sliding brackets;

FIG. 6 is a perspective view of the same portion of the folding support structure shown in FIG. 5;

FIG. 7 is a sectional view of the sliding bracket as seen along lines 7—7 of FIG. 6;

FIG. 8 is a side elevation of the sliding bracket portion of the folding support structure in accordance with another embodiment of the present invention;

FIG. 9 is an enlarged front elevational view of a wheel assembly portion of the folding support structure of FIG. 1;

FIG. 10 is a perspective view of an alternate folding means for the folding support structure in accordance with still another embodiment of the present invention, in a partially folded configuration;

FIG. 11 is another perspective view of the folding means of FIG. 10, as seen from another direction and showing the structure in its unfolded configuration;

FIG. 12 is a perspective view of another embodiment of the present invention in the form of a folding chair shown in its unfolded configuration;

FIG. 13 is a perspective view of the embodiment of FIG. 12 shown partially folded;

FIG. 14 is another perspective view of the embodiment of FIG. 12, illustrating the chair in its completely folded configuration;

FIG. 15 shows an enlarged portion of a main frame tube-supported folding mechanism seen in FIG. 12; and FIG. 16 is an end view of the enlarged portion illustrated in FIG. 15.

DESCRIPTION OF THE PREFERRED EMBODIMENTS:

Referring now to the drawings and more particularly to the folding support structure 11 illustrated in FIGS. 1, 2 and 3, there is shown a pair of rigid elongated metal frame tubes 13 having upper portions 15, lower portions 17, and intermediate portions 19. There is also shown a pair of rigid elongated seat tubes 21 each having upper portions 23, lower portions 25, and attachment or intermediate portions 27. It can be seen clearly from FIGS. 1 and 2 that planes defined by the associated frame tubes 13 and seat tubes 21 intersect along a line that is essentially perpendicular to the longitudinal axes of the frame and seat tubes in the intermediate portions 19 and 27 of the respective tubes.

A rear X brace 29 is provided having a pair of rigid rear brace members 31 and 33 pivotally interconnected, as at 35, the respective lower portions 37 and 39 of these members being pivotally attached to a different one of the seat tubes 21 at their lower portions 25, and respective upper portions 41 and 43 of the members 31 and 33 being pivotally attached to a different one of the frame tubes 13 at their upper portions 15. The pivotal interconnections 45 at the upper ends of the rear brace members and the pivotal interconnections 47 at the lower ends thereof are of the two-axis type, one of which being perpendicular to a plane defined by the rear brace members and the other axis of which being orthogonal thereto and in the plane of the respective associated tubes 13 and 21 to which the interconnections are attached. The pivotal interconnections may, for example, take the form of L-brackets having one arm loosely riveted to a rear brace member, and having another arm loosely riveted to one of the tubes.

As shown in FIGS. 2 and 4, the lower portions 51 and 53 of respective rigid front brace members 55 and 57, comprising a front X brace 59, are pivotally attached by rivets or nut/bolt assemblies 60, for example, to the lower portions 17 of the frame tubes 13. As with the rear brace 29, the front brace members are pivotally interconnected by any conventional means such as a rivet, for example, at a point 61 intermediate the ends of these members so that the X brace may fold and unfold in the plane of the members and generally parallel to the plane defined by the two frame tubes 13. The lower portions 51, 53 are preferably formed with horizontal foot rest configurations in order to comfortably accommodate a child's feet when the structure is in its unfolded position.

In the presently preferred embodiment of the invention shown in FIG. 1, the upper portions 63 and 65 of the front brace members 55 and 57 are pivotally attached to a front face 67 of a different sliding U-channel bracket 69 slidably mounted on the intermediate portions 19 of the frame tubes 13. A more detailed illustration of this arrangement is shown in FIGS. 5, 6 and 7, the latter figure clearly showing the use of a rivet 71 as the pivot pin seated in a raised portion 73 of the bracket so as not to interfere with the sliding action of the bracket on the tube 13. Also pivotally attached to each sliding bracket 69 is the intermediate portion 27 of an associated seat tube 21 by means of a rivet or bolt 75 extending through parallel sides 77 of the bracket and also through a tubeconforming spacer 79 and appropriate aligned holes in the seat tubes 21.

A desirable feature of the present invention is to include a means for preventing the rotation of the sliding brackets 69 on the frame tubes 13 when the structure is in its unfolded configuration. This may be accomplished in several ways. As exemplified in the embodiment illustrated in FIGS. 1–7, this may be accomplished by providing a square cross section in the intermediate portion 19 of the tube 13, and by using a sliding bracket having a conforming square cross section. As shown in these figures, the brackets 69 may be formed from a rectangular sheet of metal folded two times at right angles so that the two parallel sides 77 may be suitably fastened together by the rivet or bolt 75 and a rivet or bolt 81 through holes 83 using equal length spacers (not shown) extending between the inner surfaces of the sides 77 thereby enclosing the brackets 69 about the portions 19. Of course, other cross-sectional configurations may be used to provide the same function. For example, the cross sections of both the frame tubes' intermediate portions 19' and sliding brackets 69' may be circular, the latter having one or more notches 85 in their lower edges 87 to register with associated pins 89 extending outwardly from the tubes, as illustrated in FIG. 8.

In accordance with the presently preferred embodiment of the invention, ground wheels 91 are provided adjacent the lower ends of the frame and seat tubes. The wheels 91 are rotatably mounted on J-shaped axle rods 93 each having a relatively shorter section 95 and a relatively longer section 97 joined by a transverse section 99. The parallel sections extend through suitably disposed aligned holes through the tubes and secured in position by conventional means such as push nuts 101 at the ends thereof. The enlarged view of one of the wheels 91 is shown in FIG. 9 where a flat washer 103 may be seen disposed between the tube 13 and the wheels.

With reference to FIGS. 10 and 11, there is shown an alternate embodiment of the present invention wherein a pivot arm mechanism replaces the previously described sliding bracket arrangement. In this embodiment, the intermediate portions 19 of the frame tubes 13 may be of any convenient cross-sectional configuration. The upper portions 63,65 of the front brace members 55, 57 pivotally attach to associated attachment or intermediate portions 27 of the seat tubes 21 by means of, for example, L-brackets 105 and appropriate fasteners such as rivets 107 and 109, the latter having axes at right angles to each other to provide a two-axis joint at each of the pivotal interconnections.

According to this embodiment, the intermediate portions 27 of the seat tubes 21 are movably supported with respect to the frame tubes 13 by separate pivot arms 111 respectively pivotally attached at one of their ends by rivets 113 to the seat tubes, and at the other ends by rivets 115 to the associated intermediate portions 19 of the frame tubes 13. This arrangement allows the seat tubes 21 to swing on the pivot arms 111 and move upwardly with respect to the frame tubes 13 as the brackets 105 pivot downwardly about pins 109 when the front brace 59 is folded to produce the "umbrella" or "stick" configuration illustrated in FIG. 3. This is very similar to the general movement and alignment of the various components of the folding structure previously described with reference to FIGS. 1–7, where the sliding bracket 69 is utilized.

For convenience, and as an aid for supporting the support structure when not in use, the upper portions 15 of the frame tubes 13 may be provided with curved handle portions 121, as shown in FIGS. 1–4. These handles are preferably curved in an upward and forward direction for ease of handling when the structure is occupied. Although not shown, for the sake of clarity, when the structure is to be used to transport a small child, it is preferably provided with a conventional seat belt arrangement to prevent the child from leaving the seat and possibly falling to the ground.

The unfolding/folding operation of the invention is easily accomplished by simply pulling apart the two handle portions 121 and allowing a rear lock brace mechanism 123 to fall into place. This mechanism includes, in accordance with a preferred embodiment of the invention, a pair of spaced parallel folding arms 125, each pair pivotally attached at a first of their ends 127 to opposite sides of an associated lower portion 25 of a seat tube 21, and pivotally attached at their second ends 129 to each other, by a common pivot pin 131. The arms 125 in each pair may be maintained in a parallel relationship by the use of a spacer tube 133 coaxial with the pin 131, and the pivoting of the arms may be restricted at or just below the horizontal by a portion 135 of at least one of the arms 125 extending beyond the pivot pin 131 and having an upper transverse tab that engages the upper surface of an associated arm of the opposite pair when the lock brace 123 is in its unfolded horizontal position. In embodiments of the invention utilizing single wheels 91 rotatably mounted on cantilevered axles, the lock brace mechanism is preferably pivotally mounted on the seat tubes to prevent possible rotation of the seat tubes about their own longitudinal axes. However, if dual wheels are mounted on each of the seat tubes, then significant rotational torques will not be present at the seat tubes and the lock brace mechanism may be pivotally anchored to the lower portions of the rear X-brace, for example.

In order to move the support structure from its unfolded to folded configuration, the central pivoting portion of the rear lock brace mechanism 123 is moved upward by the operator's foot, for example, while the two handle portions 121 are pushed together. This causes the front and rear X braces to fold and the attachment portions 27 of the seat tubes 21 to move upwardly relative to their respective associated frame tubes 13 so that the angles between the associated frame and seat tubes lessens until these tubes are nearly parallel.

It will be seen that, unlike some prior art folding support structures that carry a set of wheels at a relatively high location when in a folded position, the rear wheels of the present invention are moved only to a relatively low position, just above the front wheels, so that there is less possibility that they would come into contact and thereby soil a user's clothing when handling the structure in its folded configuration. Also, this novel and low center of mass arrangement precludes the structure from tending to unfold by itself, as is the case in certain prior art structures, the latter requiring an additional strap or other arrangement to prevent the unfolding of the structure.

In order to prevent the support structure from rolling down an incline, for example, a conventional wheel-impingeable brake bracket 141 may be pivotally attached to a lower portion 25 of one of the seat tubes 21, as shown in FIG. 3.

As shown in FIGS. 1–3, a flexible, pouch-like structure 143 of cloth or plastic material, for example, may be disposed between the seat tubes 21 by attaching its lower forward outer ends to the upper portions 23 thereof and at its upper outer ends to the frame tubes 13 adjacent the pivotal interconnections 45.

Referring now to the folding chair embodiment 211 illustrated in FIGS. 12–14, the chair is shown to include a pair of rigid elongated metal frame tubes 213 having upper portions 215, lower portions 217, and intermediate portions 219. There is also shown a pair of rigid elongated seat tubes 221 each having upper portions 223, lower portions 225, and attachment or intermediate portions 227. Planes defined by the associated frame tubes 213 and seat tubes 221 intersect along a line that is essentially perpendicular to the longitudinal axes of the frame and seat tubes in the intermediate portions 219 and 227 of the respective tubes.

A rear X brace 229 is provided having a pair of rigid rear brace members 231 and 233 pivotally interconnected, as at 235, the respective lower portions 237 and 239 of these members being pivotally attached to a different one of the seat tubes 221 at their lower portions 225, and respective upper portions 241 and 243 of the members 231 and 233 being pivotally attached to a different one of the frame tubes 213 at their upper portions 215. The pivotal interconnections 245 at the upper ends of the rear brace members and the pivotal interconnections 247 at the lower ends thereof are of the two-axis type, one of which being perpendicular to the plane defined by the rear brace members and the other axis of which being orthogonal thereto and in the plane of the respective associated tubes 213 and 221 to which the interconnections are attached. The pivotal interconnections may, for example, take the form of L-brackets having one arm loosely riveted to a rear brace member, and having another arm loosely riveted to one of the tubes.

FIGS. 13 and 14 show the lower portions 251 and 253 of respective rigid front brace members 255 and 257, comprising a front X brace 259, are pivotally attached by rivets or nut/bolt assemblies 260, for example, to the lower portions 217 of the frame tubes 213. Similar to the rear brace 229 arrangement, the front brace members are pivotally interconnected by any conventional means such as a rivet, for example, at a point 261 intermediate the ends of these members so that the X brace may fold and unfold in the plane of the members and generally parallel to the plane defined by the two frame tubes 213. The upper portions 263 and 265 of the front brace members 255 and 257 are pivotally attached to a front surface 267 of a different sliding hollow tube section 269 slidably mounted on the intermediate portions 219 of the frame tubes 213. A more detailed illustration of this arrangement is shown in FIGS. 15 and 16.

These figures show the use of a rivet 271 as the pivot pin seated in a pair of coaxially disposed sleeve inserts 273 and 275 captured in each of the tube sections 269 so as not to interfere with the sliding action of the tube sections along the tubes 213. Pivotally anchored by the rivets 271 are the respective upper portions 263 and 267 of the front brace members 255 and 257. The sleeve inserts may be fabricated from any material exhibiting the desired sliding qualities with respect to the tubes 213. Alternately, a single insert may be employed or the rivet 271 may be seated in a raised portion, as illustrated in FIG. 7 for the previously described embodiment of the invention. Conventional washers 277 are also provided on opposite sides of the brace members at the pivot 271 in order to lessen friction at this point when the structure is folded and unfolded. The tube sections 269 are also pivotally attached to the intermediate portions 219 and 227 of the tubes 221 by means of a welded or otherwise fixedly attached brackets 279, through holes in which pivots 281 extend into and anchor to the tubes 221.

In accordance with this embodiment, there is further provided a pair of back support tubes 283, each having upper ends 285 pivotally attached by means of the pivotal interconnections 245 to the upper portions 215 of the tubes 213, while the lower ends 287 of the tubes 283 are pivotally attached by means of pivots 289 to associated seat tubes 221 between the latter's lower and intermediate ends.

Support means in the form of a flexible seat member 291 and a flexible back support member 293 of any conventional fabric or plastic material are conventionally attached as shown in FIGS. 12–14 by the use of tubular side openings to respective associated seat tubes 221 and back support tubes 283.

The unfolding operation of this embodiment of the invention is accomplished by pulling apart the two frame tubes 213, the two seat tubes 221, or the two back support tubes 283 as far as allowed by the flexible seat and back support members 291 and 293. On the other hand, these tubes are simply pushed together to fold up the structures illustrated in FIG. 14.

In view of the foregoing, it should be evident that there has herein been described a novel and highly useful folding support structure that is safe, easily operated and that incorporates improved convenient features heretofore not available in such structures.

It should be understood that although certain materials have been identified in the construction of the invention, nevertheless, these are only exemplary identifications and the materials mentioned herein are not critical and any material generally considered to be suitable for a given purpose may be substituted for those named.

Although the present invention has been shown and described with reference to particular embodiments, various changes and modifications which are obvious to persons skilled in the art to which the invention pertains are deemed to lie within the spirit, scope and contemplation of the invention.

What is claimed is:

1. A folding support structure, comprising:

a pair of rigid elongated frame tubes each having upper, lower and intermediate portions and defining a first plane therebetween;

a pair of rigid elongated seat tubes each having lower and attachment portions and defining a second plane therebetween intersecting said first plane along a movable line perpendicular to the longitudinal axes of said frame and seat tubes in said intermediate and attachment portions thereof;

a rear X brace having a pair of pivotally interconnected rigid rear brace members defining a third plane therebetween, said rear brace members being foldable in said third plane, the lower ends of said rear brace members being pivotally attached to a different one of said seat tubes at said lower portions and the upper ends thereof being pivotally attached to a different one of said frame tubes at said upper portions, the pivotal interconnections at said ends of said rear brace members being of the two-axis type one axis of which being perpendicular to said third plane and the other axis of which being orthogonal thereto and in the plane of the respective tubes to which said interconnections are attached;

a front X brace having a pair of pivotally interconnected rigid front brace members defining a fourth plane therebetween, said front brace members being foldable in said fourth plane, the lower ends of said front brace members being pivotally attached to a different one of said frame tubes at said lower portions; and folding means associated with the upper ends of said front brace members and with said intermediate portions of said frame tubes and attachment portions of said seat tubes for simultaneously causing an upward movement of said movable line in said first plane, a lessening of the angle between the lower portions of said first and second planes, and a lessening of the distance between respective ones of said frame tubes and between respective ones of said seat tubes when said support structure is moved from its open to closed configuration.

2. The folding support structure according to claim 1, wherein said seat tubes also include upper portions extending beyond said attachment portions thereof, and also comprising pliable seat structure attached to said upper portions of said seat tubes and to said upper portions of said frame tubes.

3. The folding support structure according to claim 1, also comprising a rear lock brace mechanism having folding arms, the outer ends of which arms being pivotally coupled to said lower portions of different ones of said seat tubes, said mechanism having a pivot portion joining said folding arms.

4. The folding support structure according to claim 3, wherein said rear lock brace mechanism also includes locking means associated with said pivot portion for releasably locking said folding arms in an unfolded position.

5. The folding support structure according to claim 4, wherein said locking means includes pivot rotation limiting structure only preventing said pivot portion from moving below a predetermined level from a fully extended folding arm position.

6. The folding support structure according to claim 3, wherein said folding arms each include a pair of spaced parallel arms pivotally attached to opposite sides of said lower portions of different ones of said seat tubes to inhibit rotation of said seat tubes.

7. The folding support structure according to claim 1, wherein lower portions of said front brace members each include foot rest portions that are horizontal when said folding support structure is in its unfolded configuration.

8. The folding support structure according to claim 1, also comprising wheel assemblies including separate ground wheels rotatably attached to different ones of said frame and seat tubes adjacent the lower ends thereof.

9. The folding support structure according to claim 8, wherein said wheel assemblies include a cantilevered wheel axle rotatably supporting a single one of said ground wheels.

10. The folding support structure according to claim 9, wherein said lower portions of each of said main frame and seat tubes include a pair of spaced holes therethrough, and the wheel axles are J-shaped rods passing through both said pair of spaced holes in associated ones of said frame and seat tubes.

11. The folding support structure according to claim 9, wherein each of said J-shaped rods include a relatively short segment and a relatively longer parallel segment, the ends of said segments extending outwardly through said pair of spaced holes, one of said ground wheels being rotatably mounted on that portion of said relatively longer segment extending beyond said tubes.

12. The folding support structure according to claim 8, further comprising a wheel-impingeable brake bracket pivotally attached to said lower portion of one of said seat tubes.

13. The folding support structure according to claim 1, wherein the ends of said upper portions of said frame tubes are curved to form handles.

14. The folding support structure according to claim 1, wherein said folding means includes a pair of sliding brackets each slidably mounted on said intermediate portion of a different one of said frame tubes, a different one of said front brace members and of said seat tubes being separately pivotally attached to associated ones of said sliding brackets, the axis of rotation of each of the pivotal attachments to said sliding brackets being essentially orthogonal to each other and to the longitudinal axis of each associated one of said frame tubes.

15. The folding support structure according to claim 14, wherein said intermediate portion of each of said frame tubes includes a guide, and wherein each of said sliding brackets includes a guide registering portion slidably registerable with an associated one of said guides to prevent rotation of said sliding brackets with respect to the longitudinal axis of said frame tubes when said folding support structure is in its unfolded configuration.

16. The folding support structure according to claim 15, wherein said guide is an elongated non-circular cross sectioned guide section of said intermediate portion of each of said frame tubes, and wherein said sliding brackets each include a sliding portion conforming to the shape of said guide section.

17. The folding support structure according to claim 16, wherein said guide section and said sliding portions of said sliding brackets have a generally rectangular cross section.

18. The folding support structure according to claim 16, wherein the cross-sectional configuration of both said frame tubes and said sliding brackets is essentially circular, wherein said guide is a transverse guide pin extending radially outwardly from the bottom of said intermediate portion of each of said frame tubes, and wherein said sliding brackets each include a guide pin-receiving slot in their lower ends that registers with said guide pin when said folding support structure is in its unfolded configuration.

19. The folding support structure according to claim 15, wherein each of said frame tubes includes a sliding bracket limit structure limiting the extent of downward movement of said sliding bracket when said folding support structure is in its unfolded configuration.

20. The folding support structure according to claim 14, wherein said folding means also includes a pair of pivoting front brackets each pivotally attached to said attachment portions of a different one of said seat tubes and pivotally attached to the upper ends of a different one of said front brace members, the axis of rotation of each of the pivotal attachments to said pivoting front brackets being essentially orthogonal to each other, and wherein said folding means further includes a pair of pivot arms each pivotally attached at one end to said intermediate portions of a different one of said frame tubes and each pivotally attached at an opposite end to said attachment portions of a different one of said seat tubes, the axis of rotation of each of the pivotal attachments to said pivot arms being essentially parallel to each other and orthogonal to the longitudinal axis of said frame and seat tubes.

21. The folding support structure according to claim 20, wherein the pivotal attachment of each of said pivot arms to said frame tubes is a pivot pin having an outwardly extending post portion limiting the downward movement of an associated one of said seat tubes relative to said frame tubes when said folding support structure is in its unfolded configuration.

22. The folding support structure according to claim 1, also comprising support means including a flexible member supported between said seat and frame tubes.

23. The folding support structure according to claim 22, wherein said flexible member is a flexible fabric constructed pouch-like structure attached at its lower forward outer extremities by said seat tubes and at its upper outer extremities by said frame tubes.

24. A folding chair structure, comprising:
 a pair of rigid elongated frame tubes each having upper, lower and intermediate portions and defining a first plane therebetween;
 a pair of rigid elongated seat tubes each having lower and attachment portions and defining a second plane therebetween intersecting said first plane along a movable line perpendicular to the longitudinal axes of said frame and seat tubes in said intermediate and attachment portions thereof;
 a rear X brace having a pair of pivotally interconnected rigid rear brace members defining a third plane therebetween, said rear brace members being foldable in said third plane, the lower ends of said rear brace members being pivotally attached to a different one of said seat tubes at said lower portions and the upper ends thereof being pivotally attached to a different one of said frame tubes at said upper portions, the pivotal interconnections at said ends of said rear brace members being of the two-axis type one axis of which being perpendicular to said third plane and the other axis of which being orthogonal thereto and in the plane of the respective tubes to which said interconnections are attached;
 a front X brace having a pair of pivotally interconnected rigid front brace members defining a fourth plane therebetween, said front brace members being foldable in said fourth plane, the lower ends of said front brace members being pivotally attached to a different one of said frame tubes at said lower portions;
 folding means associated with the upper ends of said front brace members and with said intermediate portions of said frame tubes and attachment portions of said seat tubes for simultaneously causing an upward movement of said movable line in said first plane, a lessening of the angle between the lower portions of said first and second planes, and a lessening of the distance between respective ones of said frame tubes and between respective ones of said seat tubes when said support structure is moved from its open to closed configuration; and
 support means including a pair of rigid back support tubes pivotally attached at their respective upper ends to associated upper portions of said frame tubes and at their respective lower ends to associated seat tubes between said intermediate and lower portions thereof.

25. The folding chair structure according to claim 24, wherein said support means also includes a flexible seat member disposed between and attached at its opposite ends to said seat tubes, and wherein said support means further includes a flexible back support member disposed between and attached at its opposite ends to said support tubes.

26. The folding chair structure according to claim 24, wherein said folding means includes a pair of sliding tubes each slidably mounted on said intermediate portion of a different one of said frame tubes, a different one of said front brace members and of said seat tubes being separately pivotally attached to associated ones of said sliding tubes, the axis of rotation of each of the pivotal attachments to said sliding tubes being essentially orthogonal to each other and to the longitudinal axis of each associated one of said frame tubes.

* * * * *